United States Patent [19]
Finkenbeiner et al.

[11] Patent Number: 5,892,798
[45] Date of Patent: *Apr. 6, 1999

[54] MODULATED CLOCK MSK MODULATOR FOR HIGH DATA RATE APPLICATIONS

[75] Inventors: Pascal G. Finkenbeiner, Torrance, Calif.; Thomas J. Kolze, Phoenix, Ariz.

[73] Assignee: TRW Inc., Redondo Beach, Calif.

[*] Notice: The term of this patent shall not extend beyond the expiration date of Pat. No. 5,748,679.

[21] Appl. No.: 963,363

[22] Filed: Nov. 3, 1997

Related U.S. Application Data

[63] Continuation of Ser. No. 430,570, Apr. 28, 1995, Pat. No. 5,748,679.

[51] Int. Cl.⁶ .................................................. H04L 27/12
[52] U.S. Cl. ........................................ 375/305; 332/100
[58] Field of Search .................................. 375/298, 305, 375/274, 261; 332/100

[56] References Cited

U.S. PATENT DOCUMENTS

| | | | |
|---|---|---|---|
| 2,977,417 | 3/1961 | Doelz et al. | 375/305 |
| 3,454,718 | 7/1969 | Perreault | 375/305 |
| 3,731,233 | 5/1973 | Hutchinson | 375/305 |
| 3,938,045 | 2/1976 | Mathwich | 375/305 |
| 3,993,868 | 11/1976 | Balcewicz | 375/274 |
| 4,414,675 | 11/1983 | Comroe | 375/274 |
| 4,438,413 | 3/1984 | Ryan | 332/100 |
| 4,500,856 | 2/1985 | Childs | 332/101 |
| 4,539,533 | 9/1985 | French | 332/101 |
| 4,584,540 | 4/1986 | DuBose et al. | 332/101 |
| 4,601,048 | 7/1986 | Ryan | 375/274 |
| 4,613,974 | 9/1986 | Vokac et al. | 375/259 |
| 4,648,098 | 3/1987 | Kerr | 375/274 |
| 4,648,099 | 3/1987 | Kerr | 375/274 |
| 4,656,646 | 4/1987 | Ryan | 375/274 |
| 4,686,688 | 8/1987 | Chung et al. | 375/274 |
| 4,897,620 | 1/1990 | Paradise | 332/100 |
| 5,014,285 | 5/1991 | Basile et al. | 375/303 |
| 5,020,075 | 5/1991 | Tachika | 375/306 |
| 5,020,079 | 5/1991 | Vancraeynest | 375/305 |
| 5,022,054 | 6/1991 | Wang | 375/305 |
| 5,048,058 | 9/1991 | Kaleh | 375/274 |
| 5,090,026 | 2/1992 | Stern et al. | 375/274 |
| 5,124,672 | 6/1992 | Kuisma | 332/103 |
| 5,155,454 | 10/1992 | Amoroso | 332/100 |
| 5,193,222 | 3/1993 | Sasaki | 455/102 |
| 5,216,391 | 6/1993 | Shiraishi et al. | 375/308 |
| 5,295,160 | 3/1994 | Shimizu | 375/274 |
| 5,309,479 | 5/1994 | Cheah | 375/303 |
| 5,329,258 | 7/1994 | Matsuura | 332/100 |
| 5,361,046 | 11/1994 | Kaewell, Jr. et al. | 332/100 |
| 5,382,924 | 1/1995 | Pardoen et al. | 375/272 |
| 5,430,711 | 7/1995 | Yamada et al. | 370/206 |

*Primary Examiner*—Temesghen Ghebretinsae
*Attorney, Agent, or Firm*—Michael S. Yatsko

[57] ABSTRACT

A modulated clock MSK modulator that separately modulates a sinusoidal clock signal by square wave I and Q digital data signals prior to the I and Q data signals being modulated onto a carrier wave signal. Mixers or applicable biphase switches are utilized to impress the I and Q digital data signal information onto the clock signal by inverting or non-inverting the clock signal on separate I and Q data rails to create I and Q modulated clock signals separated in phase. The I channel data modulated clock signal and the Q channel data modulated clock signal are then separately applied to a conventional quadraphase modulator to be separately modulated onto a carrier wave signal, and the summed together to be transmitted.

11 Claims, 2 Drawing Sheets

MODULATED CLOCK MSK MODULATOR FOR HIGH DATA RATE APPLICATIONS

This is a continuation of U.S. patent application Ser. No. 08/430,570, filed Apr. 28, 1995, now U.S. Pat. No. 5,748,679.

BACKGROUND OF THE INVENTION

1. Field of the Invention

This invention relates generally to a modulated clock minimum shift keying (MSK) modulation technique for transmitting digital data and, more particularly, to a modulated clock MSK modulation technique for transmitting digital data in which the digital data modulates or selectively switches a clock signal prior to the data being modulated onto a carrier wave signal for transmission.

2. Discussion of the Related Art

Transmission of digital data at a high data transmission rate is necessary for many types of digital communications systems. Systems requiring high digital data transmission rates include video transmission systems, satellite communications systems, etc. In these systems, digital data is generally modulated for transmission by an applicable modulation technique, such as phase modulation. Phase modulation involves modulating a carrier wave signal where the phase of the modulation wave distinguishes the "0" and "1" bits.

Minimum shift keying (MSK) modulation is one type of phase modulation applicable for high digital data transmission rates. MSK modulation involves separating the digital data into an in-phase (I) data stream and a quadrature (Q) phase data stream. The I and Q digital data streams are passed through a sinusoidal pulse shaper and then separately mixed with a carrier wave signal at the particular phase of the I and Q data streams before being recombined to be transmitted. Separating the digital data into separate modulated data streams with carriers 90° out of phase with each other allows more digital data to be transmitted within a given time interval. A background discussion of different types of MSK modulators can be found in U.S. Pat. Nos. 5,216,391 issued to Shiraishi et al.; 5,020,079 issued to Vancraeynest; and 4,500,856 issued to Childs.

One type of modulation related to MSK modulation is referred to as staggered quadrature phase shift keying (SQPSK) modulation. For SQPSK modulation, the I and Q modulated data streams are separated in phase by 90°, and one of the data streams is staggered by a one-half bit time. SQPSK modulation is distinct from MSK modulation mainly because square wave I and Q digital data signals are applied to the carrier wave signal modulator, whereas in MSK modulation only sinusoidal shaped waves are applied to the carrier wave signal modulator. For sinusoidal wave modulation, more signal energy in the modulation signal is closer to the carrier wave signal, resulting in an opportunity for greater bandwidth efficiency. Further, MSK modulation theoretically provides a constant envelope signal that results in less degrading amplitude modulation to phase modulation conversion at the output of typical nonlinear amplifiers. Other distinctions between MSK modulation and SQPSK modulation are known to those skilled in the art.

FIG. 1 depicts a known MSK modulator 10, sometimes referred to as a "Brady" type modulator. The modulator 10 includes a mixer 12 that mixes a sinusoidal one-half clock signal and a sinusoidal carrier wave signal so that the one-half clock signal modulates the carrier wave. The modulated carrier wave signal is then applied to a diplexer 14 that acts as a tuned filter to separate the two frequencies comprising the modulated carrier wave signal. The separated frequencies from the diplexer 14 are then applied to a magic-T circuit 16 that includes a specialized configuration of phase and amplitude equalizers (PAE) 18 that processes the I and Q data rail signals to get signals having highly controlled phase and amplitude. The I data rail modulated carrier wave is then applied to an I data rail mixer 20 that mixes the I data rail modulated carrier wave with a square wave I digital data signal. The Q data rail modulated carrier wave is then applied to a Q data rail mixer 22 that mixes the Q data rail modulated carrier wave with a square wave Q digital data signal. The modulated I and Q digital data signals from the mixers 20 and 22 are then applied to a summer 24 that sums the signals in phase. An output signal S(t) of data and clock signals modulated onto a carrier wave signal is emitted from the modular 10 to a transmitter.

FIG. 2 depicts another MSK modulator 30, sometimes referred to as a "Collins" modulator. An example of this type of MSK modulator can be found in U.S. Pat. No. 4,648,098 issued to Kerr. In this version, a one-half clock signal is applied to a first 90° hybrid coupler 32 to separate the clock signal into two clock signals that are out of phase with each other by 90°. A local oscillator signal acting as a carrier wave signal is applied to a second 90° hybrid coupler 34 to separate the local oscillator signal into two signals that are 90° apart in phase. The zero phase signals from the coupler 32 and the coupler 34 are mixed in a mixer 36 to create a modulated carrier wave signal for an I data rail. The 90° phase signals from the coupler 32 and the coupler 34 are mixed in a mixer 38 to create a modulated carrier wave signal for a Q data rail. The zero phase I data rail signal is then applied to a series of PAEs 40, and the 90° phase Q data rail signal is then applied to a series of PAEs 42 so that the I and Q data rail signals are substantially equal in amplitude and are separated by 90°. The I data rail signal from the PAEs 40 is applied to a mixer 44 to be mixed with a square wave I digital data signal, and the Q rail signal from the PAEs 42 is applied to a mixer 46 to be mixed with a square wave Q digital data signal. The I data signal modulated onto the carrier wave and the Q data signal modulated onto the carrier wave are then summed in a summer 48 to be transmitted as a signal S(t).

As is apparent from the discussion of the prior art modulators 10 and 30 above, the clock signal modulates the carrier wave prior to the digital data signals being impressed upon the carrier wave. For this and other reasons, the prior art MSK modulators suffer from a number of disadvantages. Particularly, the modulator 10 requires extensive amplitude/phase balancing in the magic-T circuit 16 that is different for each different data rate. Further, the modulator 10 may require heaters to compensate for temperature variations in the temperature sensitive diplexer 14. Also, the modulator 10 requires significant data/clock signal alignment and a different diplexer for each different data rate, and is not readily configured into monolithic microwave integrated circuit (MMIC) technology. The modulator 30 requires difficult high frequency linear modulation development with high local oscillator/RF isolation to remove local oscillator leakage in the mixers 36 and 38. Also, the modulator 30 requires amplitude/fade balance tuning, significant data/clock signal alignment and different BPFs for different data rates. Other types of MSK modulators known in the art suffer from these and other disadvantages.

What is needed is an MSK modulator that provides high data rate transmission, but does not suffer from the above and other drawbacks of known MSK modulators. It is therefore an object of the present invention to provide such a modulator.

SUMMARY OF THE INVENTION

In accordance with the teaching of the present invention, a modulated clock MSK modulator is disclosed that separately modulates a sinusoidal clock signal by square wave I and Q digital data signals prior to the I and Q data signals being modulated onto a carrier wave signal. Mixers or applicable biphase switches are utilized to impress the I and Q digital data signal information onto the clock signal by inverting or not inverting the clock signal on separate I and Q data rails to create I and Q modulated clock signals separated in phase. The I channel data modulated clock signal and the Q channel data modulated clock signal are then separately applied to a quadraphase modulator to be separately modulated onto a carrier wave signal and then summed together to be transmitted.

Additional objects, advantages, and features of the present invention will become apparent from the following description and appended claims, taken in conjunction with the accompanying drawings.

DETAILED DESCRIPTION OF THE PREFERRED EMBODIMENTS

The following discussion of the preferred embodiments directed to a modulated clock MSK modulator is merely exemplary in nature and is in no way intended to limit the invention or its applications or uses.

Applicant's invention is directed to a modulated clock MSK modulation technique. In general terms, Applicant's MSK modulator uses square wave digital data signals that are to be transmitted to either invert ("0") or non-invert ("1") a sinusoidal clock signal. The clock signal is applied to a separate I data channel rail and Q data channel rail so that the clock signal separately inverts or doesn't invert the I and Q data depending on the value of the data. Therefore, the data is shaped by the clock signal, and is then applied to a final modulation process in both the I and Q data channels to modulate a carrier wave signal for transmission. In one embodiment, the sinusoidal clock signal is applied at one-quarter the bit rate of the data, i.e., one-half the symbol rate per I and Q data rail. Typical applications for modulators of this type are for communication systems that have carrier frequencies greater than 1 GHz and data rates greater than 200 Mbps.

Figure 1:
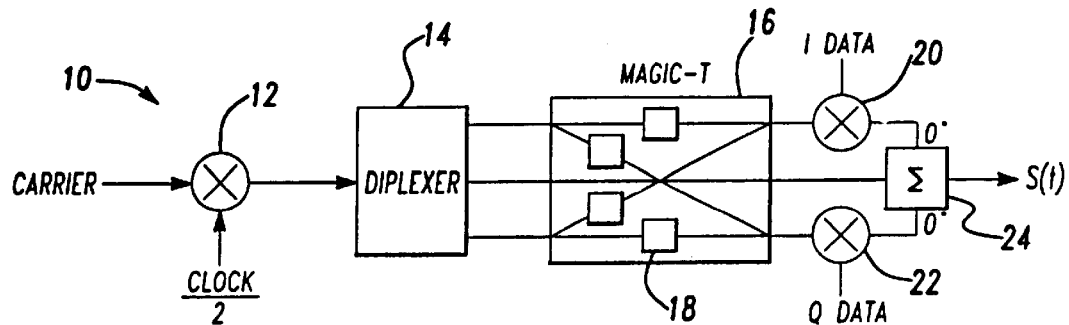
FIG. 1 is a schematic block diagram depiction of a first prior art MSK modulator.
Figure 2:
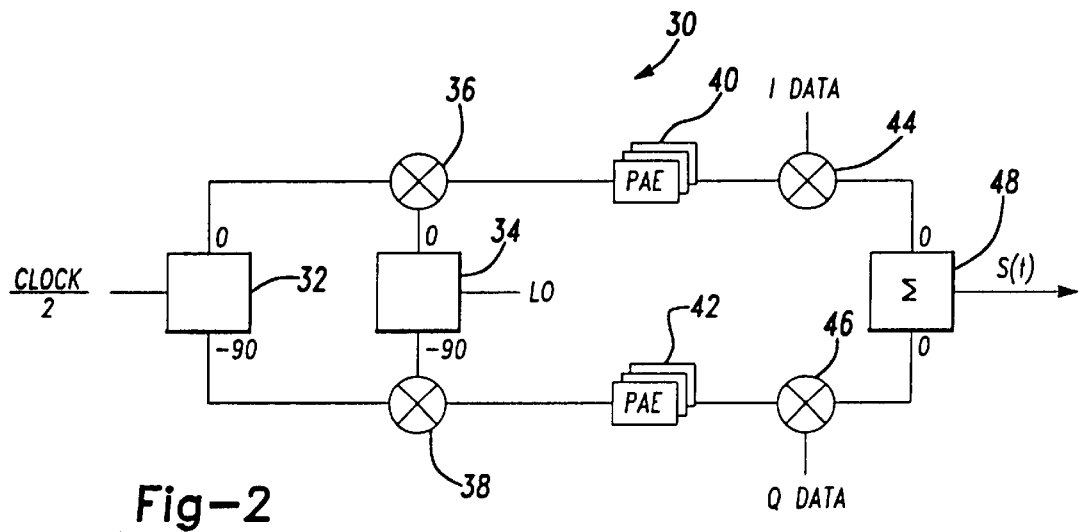
FIG. 2 is schematic block diagram depiction of a second prior art MSK modulator.
Figure 3:
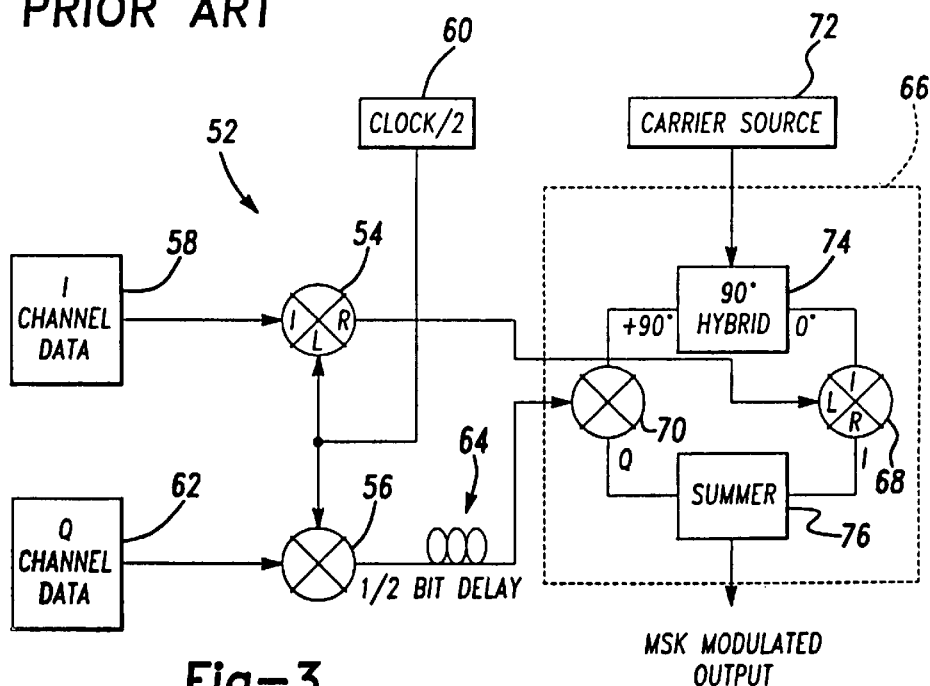
FIG. 3 is a schematic block diagram of a modulated clock MSK modulator according to one embodiment of the present invention.

Turning to FIG. 3, a schematic block diagram of a modulated clock MSK modulator 52 according to one embodiment of the present invention is shown. In this embodiment, a first mixer 54 and a second mixer 56 are used to modulate the clock signal with I and Q channel data. A square wave I channel data signal from an I channel data source 58 is applied to an intermediate frequency port of the mixer 54 that drives the mixer 54 into saturation, and a one-half sine wave clock signal from a clock divide-by-two system 60 is applied to a local oscillator port of the mixer 54 to drive the mixer 54 linearly. The mixer 54 modulates the I channel data signal onto the one-half clock signal by using the I channel data to invert or non-invert the one-half clock signal to provide an I channel data modulated clock signal at an RF port of the mixer 54. By using the I channel data signal to modulate the one-half clock signal, the information provided by the I channel data signal is impressed onto the clock signal by selecting either a zero phase or a 180° phase of the clock signal depending on the information in the data signal.

Likewise, a square wave Q channel data signal from a Q channel data source 62 is applied to an intermediate frequency port of the mixer 56 that drives the mixer 56 into saturation, and the one-half clock signal from the clock divide-by-two system 60 is applied to a local oscillator port of the mixer 56 to drive the mixer 56 linearly. The mixer 56 modulates the Q channel data signal on to the one-half clock signal by using the Q channel data to invert or non-invert the one-half clock signal to provide a Q channel data modulated clock signal at an RF port of the mixer 56.

The Q channel data modulated clock signal is applied to a one-half bit delay system 64 to provide the necessary stagger between the I and Q channel data signals by one-half of the per rail bit time as is conventional in an MSK modulator. By staggering the Q channel data rail by a one-half bit relative to the I channel data rail, the chance that the I and Q channel data signals will transition at the same time during a final modulation onto a carrier wave signal (discussed below) is eliminated. What this means is that a complete turn on or turn off of the carrier wave signal will not occur. Therefore, amplitude modulation at the output is decreased. The one-half clock signal sweeps out 180° during a bit time per channel, and is synchronized with the bit clock in each channel so that the zero crossings of the clock signal are coincident with the zero crossings in the I and Q channel data transitions.

Figure 4:
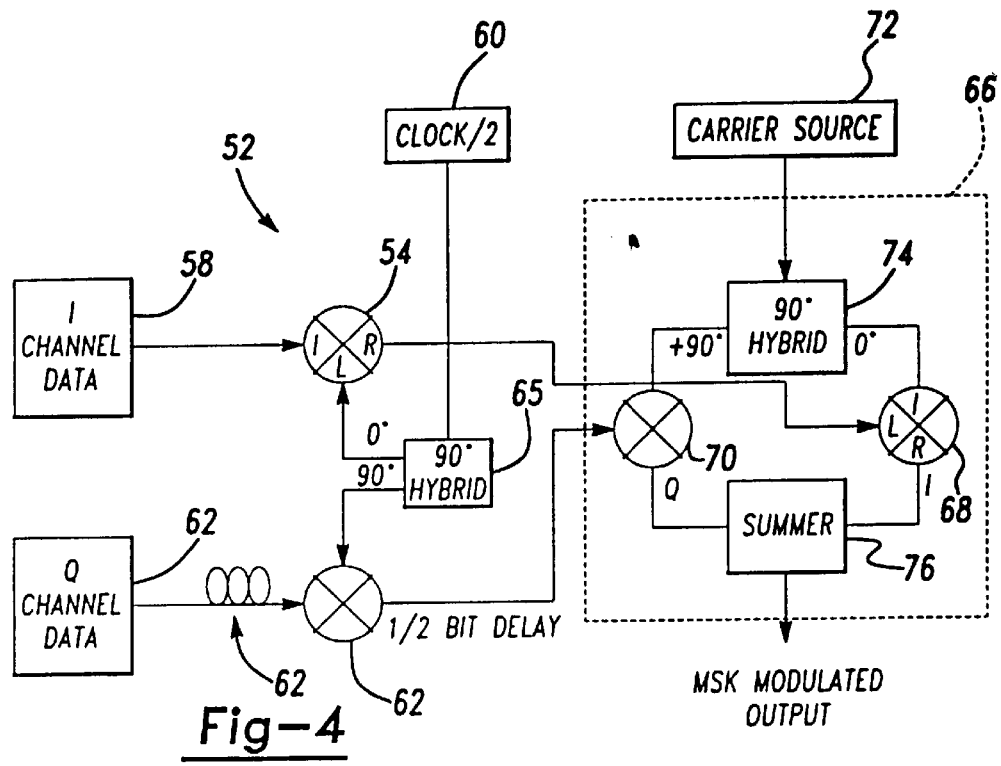
FIG. 4 is a schematic block diagram of a modulated clock MSK modulator according to another embodiment of the present invention.

The embodiment as shown in FIG. 3 where the bit delay is provided on the Q channel data stream after the mixer 56 is just one example of performing this delay. Of course, the I channel data can be delayed instead of the Q channel data for different implementations. Also, the bit delay can be implemented prior to either of the mixers 54 or 56. An example of this is shown in FIG. 4, where the one-half bit delay system 64 is applied to the Q channel data stream prior to when the mixer 56 mixes the clock signal with the Q channel data. Additionally, in this example, a 90° hybrid coupler 65 is provided to separate the one-half clock signal from the clock system 60 into a 0° one-half clock signal and a 90° one-half clock signal. The 0° clock signal is applied to the mixer 54 to be mixed with the I channel data, and the 90° one-half clock signal is applied to the mixer 56 to be mixed with the Q channel data in the manner as discussed above. The embodiment shown in FIG. 4 provides the best way in minimizing degrading amplitude modulation at an output of the modulator 52.

The staggered I and Q channel data signals from the mixers 54 and 56 are then applied to a quadraphase modulator 66 well known to those skilled in the art. In the quadraphase modulator 66, the I channel data modulated clock signal is applied to a local oscillator port of a third mixer 68, and the Q channel data modulated clock signal is applied to a local oscillator port of a fourth mixer 70. The I and Q channel data signals drive the mixers 68 and 70 linearly instead of in saturation. A sinusoidal carrier wave signal generated by a carrier source 72 is applied to a 90° hybrid coupler 74. The 90° hybrid coupler 70 separates the carrier wave signal into two carrier wave signals that are 90° apart in phase. Other types of couplers known in the art can also be used. The zero degree carrier wave signal is applied to an intermediate frequency port of the mixer 68 at the same phase as the I channel data modulated clock signal. Likewise, the 90° phase carrier wave signal is applied to an intermediate frequency port of the mixer 70 at the phase of the Q channel data modulated clock signal.

The mixer 68 linearly mixes the I channel data signal and the carrier wave signal to produce a modulated I channel carrier wave signal that is modulated with the I channel data and the one-half clock signal at an RF output port of the mixer 64. The mixer 70 linearly mixes the Q channel data signal and the carrier wave signal to provide a modulated carrier wave signal that is modulated with the Q channel data and the one-half clock signal at an RF output port of the mixer 70. The I and Q modulated data signals at the RF ports of the mixers 68 and 70 are then applied to a summer 76 that sums the I and Q channel data signals together to generate an MSK modulated output signal. Note that in this embodiment, only sinusoidal signals are applied to the conventional quadraphase modulator portion of the modulator 52.

Figure 5:
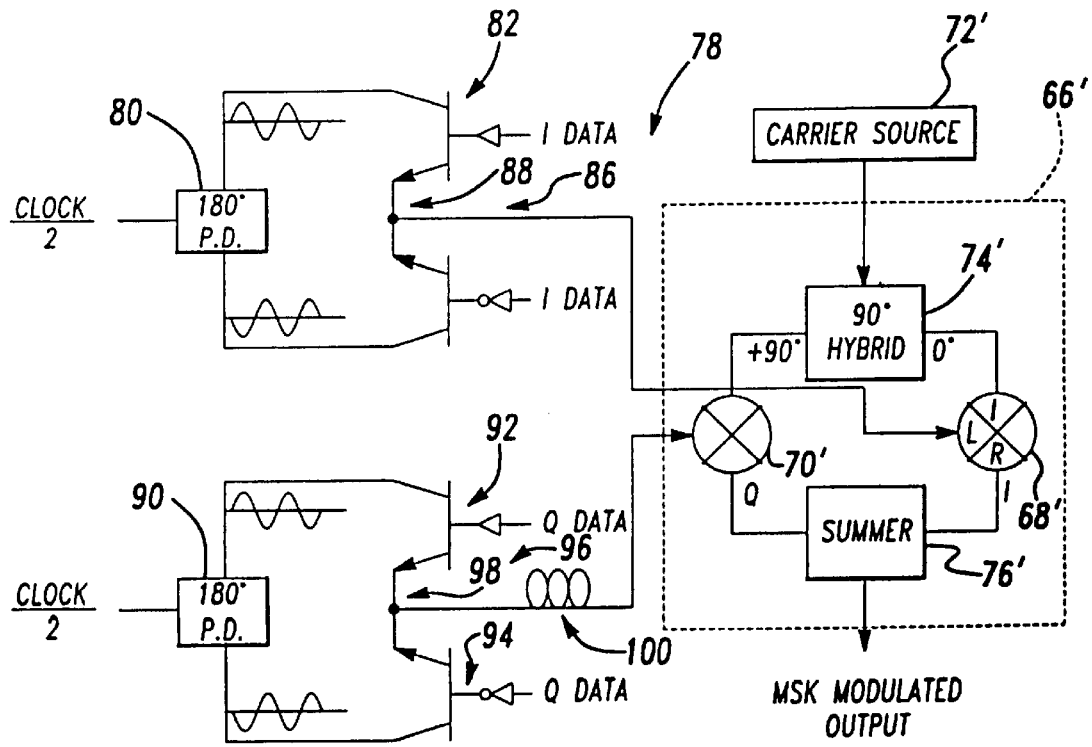
FIG. 5 is a schematic block diagram of a modulated clock MSK modulator according to yet another embodiment of the present invention.

The use of the mixers 54 and 56 as a technique for modulating the one-half clock signal with the I and Q channel digital data bits is one way of achieving the desired modulation signals. However, other suitable techniques that provides this function are also applicable. FIG. 5 shows an MSK modulator 78 according to another embodiment of the invention. In this embodiment, biphase switches are selectively switched by the I and Q channel digital data signals to invert or not invert a sinusoidal clock signal to provide the clock modulation.

In an I channel data rail, a one-half clock input signal is applied to a 180° phase delay device 80 to generate two clock signals that are 180° apart in phase. The zero phase clock signals is applied to the collector terminal of a transistor switch 82 and the 180° phase clock signal is applied to the collector terminal of a transistor switch 84. The combination of the transistor switches 82 and 84 make up a biphase switch 86. The transistor switches 82 and 84 are used by way of a non-limiting example in that other types of switches, including FET transistor switches and PIN diode switches, will be suitable for the purposes described herein. A non-inverted square wave I channel data signal is applied to the base terminal of the transistor switch 82 so as to turn the switch 82 on and off with respect to the digital pulses in the square wave I channel data signal. An inverted square wave I channel data signal is applied to the base terminal of the transistor switch 84 so as to turn the switch 84 on and off with respect to the digital pulses in the inverted I channel data signal. The zero phase and the 180° phase sinusoidal clock signals are then combined at node 88 through the switches 82 and 84, respectively, such that the resulting signal at the node 88 is a modulated clock signal modulated by the information on the inverted and non-inverted I channel data signal.

A Q channel data rail of the modulator 78 also includes a 180° phase delay device 90 and transistor switches 92 and 94 that make up a biphase switch 96. Inverted and non-inverted square wave Q channel data signals are applied to the switches 92 and 94, respectfully, to selectively allow the zero phase and the 180° phase one-half clock signal to be modulated by the information on the Q data channel and combined at node 98 in the same manner as with the I channel data rail discussed above. Of course, a single phase delay device can be incorporated where the zero phase one-half clock signal is applied to the switches 82 and 92, and the 180° phase one-half clock signal is applied to the switches 84 and 94. A one-half bit delay device 100 is provided for the Q channel data modulated clock signal to provide the necessary staggering between the I and Q rails.

The I channel data modulated clock signal and the staggered Q channel data modulated clock signal are then applied to a quadraphase modulator 66' as with the modulator 52 discussed above. The quadraphase modulator 66' of the MSK modulator 78 has designated reference numerals the same as that of the quadraphase modulator 66 of the MSK modulator 52 followed by a prime, and operates in the same manner as discussed above.

With the modulator implementation of FIGS. 3, 4 and 5 discussed above, the I and Q channel data signals alternately invert or non-invert the clock signals which provides the pulse shaping. Therefore, inversion on every other data bit on each of the channels must be supplied at either the input to the modulator or the demodulated data at the output. If performed after demodulation, there is an ambiguity that exists. It is therefore usually best to perform a wipe off at the modulator in synchronization with the clock signal so that non-inverted data is ultimately transmitted.

The use of the mixers 54 and 56 with respect to the modulator 52 and the use of the biphase switches 86 and 96 with respect to the modulator 78 as discussed above, offer two different ways of causing the digital data to modulate the clock signal prior to modulating the carrier wave signal. However, as will be appreciated by those skilled in the art, different techniques for modulating the clock signal with the digital data information prior to modulating the carrier wave can be provided without departing from the spirit and scope of the invention. With this in mind, it is apparent that the modulators 52 and 78 can be combined in that a biphase switch can be used to modulate the clock signal for one of either the I or Q channel data sequences, and a mixer can be used to mix the other of the I or Q channel data onto the clock signal. Further, the modulation technique discussed above, is applicable for various types of transmission systems and frequencies applicable for MSK and SQPSK modulation. Such systems can include transmission of data between earth based and satellite based systems, fiber-optic transmission, as well as hard wire transmissions.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A minimum shift keying (MSK) modulator comprising:
   a clock device for generating a sinusoidal clock signal;
   an I channel data device for generating a sequence of I channel data bits;
   a Q channel data device for generating a sequence of Q channel data bits;
   a clock modulation device for modulating the clock signal with the I and Q channel data bits to shape the data bits by either inverting or non-inverting the sinusoidal clock signal, wherein the clock modulation device generates a sinusoidal I channel modulated clock signal and a sinusoidal Q channel modulated clock signal, and wherein the Q channel modulated clock signal is applied to a bit delay device that delays the Q channel modulated clock signal relative to the I channel modulated clock signal; and a carrier wave modulation device for modulating a carrier wave signal, said carrier wave modulation device being responsive to the I and Q channel modulated clock signals to generate an MSK modulated output signal including the I and Q data bits.

2. The modulator according to claim 1 wherein the clock modulation device includes an I channel data mixer and a Q channel data mixer, said I channel data mixer mixing the I channel data bits with the clock signal to create the I channel modulated clock signal and said Q channel data mixer mixing the Q channel data bits with the clock signal to create the Q channel modulated clock signal.

3. The modulator according to claim 1 wherein the clock modulation device includes a first biphase switch and a second biphase switch, said first biphase switch being responsive to inverted and non-inverted I channel data bits to selectively invert or non-invert the clock signal to create the I channel modulated clock signal, said second biphase switch being responsive to inverted and non-inverted Q channel data bits to selectively invert or non-invert the clock signal to create the Q channel modulated clock signal.

4. The modulator according to claim 3 further comprising a 180° phase delay device, said clock signal being applied to the phase delay device so as to separate the clock signal into a zero phase clock signal and a 180° phase clock signal, wherein the zero phase clock signal and the 180° phase clock signal are applied to the first biphase switch to be selectively inverted and not inverted by the I channel data bits, and wherein the zero phase clock signal and the 180° phase clock signal are applied to the second biphase switch to be selectively inverted and not inverted by the Q channel data bits.

5. The modulator according to claim 3 wherein the first biphase switch includes first and second transistor switches and the second biphase switch includes first and second transistor switches, and wherein the non-inverted I channel data bits control the switching of the first switch of the first biphase switch, the inverted I channel data bits control the switching of the second switch of the first biphase switch, the non-inverted Q channel data bits control the switching of the first switch of the second biphase switch and the inverted Q channel data bits control the switching of the second switch of the second biphase switch.

6. The modulator according to claim 1 wherein the clock modulation device is responsive to a one-half clock signal.

7. The modulator according to claim 1 wherein the clock modulation device includes a coupler, said coupler separating the clock signal into a first phase clock signal and a second phase clock signal, said first phase clock signal generating the sinusoidal I channel modulated clock signal and the second phase clock signal generating the sinusoidal Q channel modulated clock signal.

8. The modulator according to claim 7 wherein the first and second clock signals are separated in phase by 90°.

9. The modulator according to claim 1 wherein the carrier wave modulation device includes a 90° coupler that separates the carrier wave signal into a zero phase carrier wave signal and a 90° carrier wave signal, said carrier wave modulation device further including a first mixer and a second mixer, wherein the first mixer mixes the I channel data modulated clock signal with the zero phase carrier wave and the second mixer mixes the Q channel data modulated clock signal with the 90° carrier wave signal, said carrier wave modulation device including a summer for summing together the I channel modulated carrier wave signal and the Q channel modulated carrier wave signal to generate the MSK modulated output signal.

10. A method of modulating digital data by a minimum shift keying (MSK) technique, said method comprising:

providing a sinusoidal clock signal;

providing a sequence of I channel data bits;

providing a sequence of Q channel data bits;

modulating the clock signal with the I channel data bits so as to generate a sinusoidal I channel modulated clock signal and modulating the clock signal with the Q channel data bits so as to generate a sinusoidal Q channel modulated clock signal, said step of modulating including the step of inverting and non-inverting the sinusoidal clock signal;

delaying the Q channel modulated clock signal for a predetermined period of time relative to the I channel modulated clock signal; and modulating a carrier wave signal with the I and Q channel modulated clock signals to generate an MSK modulated output signal including the I and Q data bits.

11. The method according to claim 10 wherein the steps of modulating the clock signal with the I and Q channel data bits includes the steps of using a I channel data mixer to mix the I channel data bits with the clock signal to create the I channel modulated clock signal and using a Q channel data mixer to mix the Q channel data bits with the clock signal to create the Q channel modulated clock signal.

* * * * *